(12) United States Patent
Lee et al.

(10) Patent No.: US 10,959,080 B2
(45) Date of Patent: Mar. 23, 2021

(54) ELECTRONIC DEVICE AND METHOD FOR PROVIDING EMERGENCY CALL, AND SERVER THEREFOR

(71) Applicant: SAMSUNG ELECTRONICS CO., LTD., Suwon-si (KR)

(72) Inventors: Shin-Duck Lee, Daegu (KR); Hyun-Chul Lee, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/492,223

(22) PCT Filed: Mar. 16, 2018

(86) PCT No.: PCT/KR2018/003124
§ 371 (c)(1),
(2) Date: Sep. 9, 2019

(87) PCT Pub. No.: WO2018/169364
PCT Pub. Date: Sep. 20, 2018

(65) Prior Publication Data
US 2020/0015063 A1 Jan. 9, 2020

(30) Foreign Application Priority Data
Mar. 16, 2017 (KR) .................. 10-2017-0033342

(51) Int. Cl.
*H04W 4/90* (2018.01)
*H04W 4/80* (2018.01)
(Continued)

(52) U.S. Cl.
CPC .............. *H04W 4/90* (2018.02); *H04W 4/80* (2018.02); *H04W 76/50* (2018.02); *H04W 88/18* (2013.01)

(58) Field of Classification Search
CPC ......... H04W 4/90; H04W 4/80; H04W 48/18; H04W 76/50; H04W 88/06; H04W 4/02;
(Continued)

(56) References Cited

U.S. PATENT DOCUMENTS 9,877,346 B2 * 1/2018 Sedlacek et al. ..... H04W 76/02
10,057,927 B2 * 8/2018 Kiss et al. .......... H04W 76/007
(Continued)

FOREIGN PATENT DOCUMENTS

JP 2013-516805 5/2013
KR 10-2013-0020252 2/2013
(Continued)

OTHER PUBLICATIONS

International Search Report for PCT/KR2018/003124, dated Jun. 22, 2018, 5 pages.
(Continued)

*Primary Examiner* — Meless N Zewdu
(74) *Attorney, Agent, or Firm* — Nixon & Vanderhye, P.C.

(57) ABSTRACT

Various embodiments of the present invention relate to an electronic device and method for providing an emergency call, and a server for providing the same. To this end, the electronic device according to the various embodiments of the present invention comprises: a short-range wireless communication circuit; a memory for storing at least one piece of content; and at least one processor electrically connected with the short-range wireless communication circuit and the memory, wherein the processor transmits, to a server, a request for registering to a first communication network, receives, from the server, a message for indicating whether an emergency call for a first communication network of another provider can be supported, and can display the received message. Other embodiments are also possible.

16 Claims, 5 Drawing Sheets

(51) Int. Cl.
   *H04W 88/18* (2009.01)
   *H04W 76/50* (2018.01)

(58) Field of Classification Search
   CPC ....... H04W 84/12; H04W 4/22; H04W 76/00;
                H04W 4/14; H04W 4/16; H04W 4/21;
                H04W 16/00; H04W 84/18; H04W 84/22;
                H04W 88/02; H04W 88/08; H04W
                84/045; H04W 84/16; H04W 84/105;
                H04W 12/009; H04W 12/0403; H04W
                28/021; H04W 68/12; H04W 68/00;
                H04W 88/18; H04W 88/00; H04W
                88/182; H04W 88/184; H04L 29/06;
                H04B 7/26; H04M 3/42; H04M 1/725;
                H04M 3/5116; H04M 2242/04
   See application file for complete search history.

(56) References Cited

U.S. PATENT DOCUMENTS

| 2007/0060097 | A1* | 3/2007 | Edge et al. ................. 455/404.1 |
| 2009/0296688 | A1* | 12/2009 | Bakker et al. ................ 370/352 |
| 2011/0171926 | A1* | 7/2011 | Faccin et al. .............. 455/404.1 |
| 2012/0231760 | A1* | 9/2012 | Zhu et al. .................. 455/404.1 |
| 2012/0289182 | A1 | 11/2012 | Bourdu et al. |
| 2013/0045707 | A1 | 2/2013 | Lee et al. |
| 2013/0052981 | A1* | 2/2013 | Zarri et al. ................. 455/404.1 |
| 2014/0286308 | A1 | 9/2014 | Lee et al. |
| 2015/0056944 | A1* | 2/2015 | Bhatiya et al. ... H04M 1/72538 |
| 2016/0050554 | A1* | 2/2016 | Ben Shlush et al. ... H04W 8/12 |
| 2016/0345152 | A1* | 11/2016 | Melander et al. ...... H04W 4/22 |
| 2018/0091967 | A1* | 3/2018 | Gupta .................... H04W 8/02 |
| 2018/0139692 | A1* | 5/2018 | Liu et al. .............. H04W 48/18 |
| 2018/0146359 | A1* | 5/2018 | Pawar et al. ............ H04W 4/90 |
| 2018/0234469 | A1* | 8/2018 | Kim et al. .......... H04L 65/1073 |
| 2019/0313232 | A1* | 10/2019 | Lee et al. ............... H04W 4/90 |
| 2020/0305224 | A1* | 9/2020 | Chong et al. ......... H04W 76/50 |

FOREIGN PATENT DOCUMENTS

| KR | 10-2013-0064287 | 6/2013 |
| KR | 10-2013-0137245 | 12/2013 |
| KR | 10-2016-0120515 | 10/2016 |

OTHER PUBLICATIONS

Written Opinion of the ISR for PCT/KR2018/003124, dated Jun. 22, 2018, 6 pages.

\* cited by examiner

ELECTRONIC DEVICE AND METHOD FOR PROVIDING EMERGENCY CALL, AND SERVER THEREFOR

This application is the U.S. national phase of International Application No. PCT/KR2018/003124 filed 16 Mar. 2018, which designated the U.S. and claims priority to KR Patent Application No. 10-2017-0033342 filed 16 Mar. 2017, the entire contents of each of which are hereby incorporated by reference.

TECHNICAL FIELD

Various embodiments of the disclosure relate to an electronic device and a method for providing an emergency call, and a server that provides an emergency call.

BACKGROUND ART

In recent years, various services and additional functions provided by an electronic device have been gradually increasing. In order to increase the availability of the electronic devices and satisfy various demands of users, communication service providers or the electronic device manufacturers have provided more various functions and are competitively developing electronic devices for differentiation from other businesses.

Such electronic devices may inform the users when there is a method for providing a network for an emergency call or an emergency call. When the users encounter an emergency situation, the electronic devices need to alert the users such that the users may recognize that an emergency call can be used.

DETAILED DESCRIPTION OF THE INVENTION

Technical Problem

Because a determination on whether an electronic device will process an emergency call through a first communication network (e.g., VoWiFi) or a second communication network (e.g., 2G/3G/4G or LTE) is made in advance by a service provider that provides a communication service, the electronic device cannot recognize whether a server supports the emergency call. Further, because the electronic device cannot display a possibility of the emergency call of the first communication network in an area in which the first communication network (e.g., VoWiFi) is available, the user cannot determine whether an emergency call is possible.

Various embodiments of the disclosure provide an electronic device that can recognize whether an emergency call can be processed through a second communication network and can display whether the emergency call is processed.

Technical Solution

Various embodiments of the disclosure relate to an electronic device and a method for providing an emergency call, and a server that provides an emergency call.

In accordance with an aspect of the disclosure, an electronic device includes: a short range wireless communication circuit; a memory configured to store at least one content; and at least one processor electrically connected to the short range wireless communication circuit and the memory, wherein the processor is configured to: transmit, to a server, a request for registration in a first communication network; receive, from the server, a message indicating whether a first communication network of another service provider supports an emergency call, and display the received message.

In accordance with another aspect of the disclosure, a method for providing an emergency call by an electronic device includes: transmitting, to a server, a request for registration in a first communication network; receiving, from the server, a message indicating whether a first communication network of another service provider can support an emergency call; and displaying the received message.

In accordance with another aspect of the disclosure, a server includes: a short range wireless communication circuit; a memory configured to store at least one content; and at least one processor electrically connected to the short range wireless communication circuit and the memory, wherein the processor is configured to: receive, from an electronic device, a request for registration in a first communication network; and when the registration in the first communication network fails, transmit a message indicating whether a first communication network of another service provider can support the emergency call.

Advantageous Effects

According to various embodiments of the disclosure, by providing an electronic device and a method that provide an emergency call, and a server that provides an emergency call, the electronic device can use an emergency call even when a communication network provided by another service provider is used, and can allow a user to recognize that the function of the emergency call can be used by displaying a message indicating whether the emergency call can be supported. In addition, according to various embodiments of the disclosure, because the electronic device can recognize whether an emergency call of an IMS server that supports VoWiFi and display the result, the user can recognize that the emergency call of the electronic device is available in an emergency situation.

MODE FOR CARRYING OUT THE INVENTION

Figure 1:
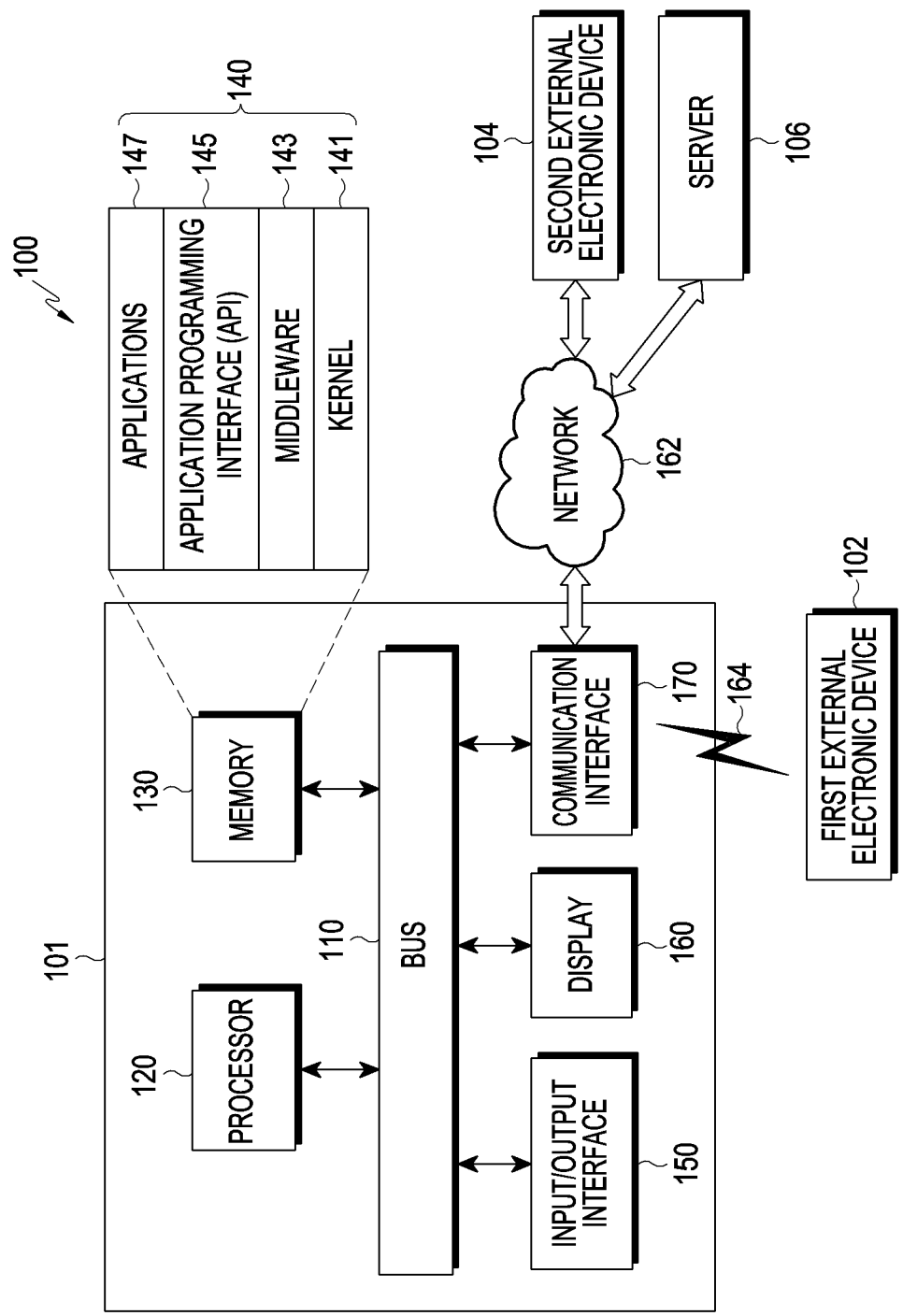
FIG. 1 illustrates an electronic device 101 in a network environment 100 according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smartphone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. According to an embodiment of the disclosure, the electronic devices are not limited to those described above. In the disclosure, the term "user" may indicate a person using an electronic device or a device (e.g., an artificial intelligence electronic device) using an electronic device.

Referring to FIG. 1, an electronic device 101 in a network environment 100 according to various embodiments will be described.

The electronic device 101 may include a bus 110, a processor 120, a memory 130, an input/output interface 150, a display 160, and a communication interface 170. In some embodiments, the electronic device 101 may exclude at least one of the components or may additionally include another component. The bus 110 may include, for example, a circuit that connects the components 110 to 170 and transfers communications (e.g., control messages and/or data) between the components.

The processor 120 may include one or more of a central processing unit, an application processor, or a communication processor (CP). The processor 120, for example, may execute operations or data processing related to the control or communication of at least one other component of the electronic device 101.

The memory 130 may include volatile or nonvolatile memories. The memory 130, for example, may store a command or data related to at least one other component of the electronic device 101. According to an embodiment, the memory 130 may store software and/or a program 140. The program 140, for example, may include a kernel 141, middleware 143, an application programming interface (API) 145, or an application program (or an application) 147. At least some of the kernel 141, the middleware 143, or the API 145 may be referred to as an operating system (OS). The kernel 141, for example, may control or manage system resources (e.g., the bus 110, the processor 120, and the memory 130) that are used to execute operations or functions implemented in the other programs (e.g., the middleware 143, the API 145, or the applications 147). Further, the kernel 141 may provide an interface through which the middleware 143, the API 145, or the applications 147 access individual components of the electronic device 101 to control or manage the system resources.

The middleware 143, for example, may function as an intermediary that allows the API 145 or the applications 147 to communicate with the kernel 141 to exchange data. Further, the middleware 143 may process one or more work requests received from the application programs 147, according to their priorities. For example, the middleware 143 may give a priority, by which a system resource (e.g., the bus 101, the processor 120, or the memory 130) of the electronic device 101 may be used, to at least one of the application programs 147 and process the one or more request for work. The API 145 is an interface used, by the application 147, to control a function provided from the kernel 141 or the middleware 143, and may include, for example, at least one interface or function (e.g., an instruction) for file control, window control, image processing, and text control. The input/output interface 150, for example, may deliver commands or data input from the user or another external device to another element(s) of the electronic device 101, or may output commands or data received from another element(s) of the electronic device 101 to the user or another external device.

The display 160, for example, may include a liquid crystal display (LCD), a light emitting diode (LED) display, an organic light emitting diode (OLED) display, a micro electromechanical system (MEMS) display, and an electronic paper display. The display 160, for example, may display various contents (e.g., a text, an image, a video, an icon, or a symbol). The display 160 may include a touchscreen and receive, for example, a touch, a gesture, a proximity, or a hovering input using an electronic pen or the user's body. The communication interface 170, for example, may set a communication between the electronic device 101 and an external device (e.g., a first external electronic device 102, a second external electronic device 104, or a server 106). For example, the communication interface 170 may be connected to a network 162 through a wireless communication (or a short range wireless communication) or a wired communication to communicate with an external device (e.g., the second external electronic device 104 or the server 106).

The wireless communication, for example, may include a cellular communication that uses at least one of long-term evolution (LTE), LTE-advanced (LTE-A), code division multiple access (CDMA), wideband CDMA (WCDMA), a universal mobile telecommunications system (UMTS), wireless broadband (WiBro), or a global system for mobile communications (GSM). According to an embodiment, as exemplified by an element 164 of FIG. 1, the wireless communication (or short range wireless communication), for example, may include at least one of wireless fidelity (WiFi), light fidelity (LiFi), Bluetooth, Bluetooth low energy (BLE), ZigBee, near field communication (NFC), magnetic secure transmission, radio frequency (RF), or a body airless network (BAN) According to an embodiment, the wireless communication may include GNSS. The GNSS, for example, may be a global positioning system (GPS), a global navigation satellite system (Glonass), a Beidou navigation satellite system (hereinafter, "Beidou"), or the European global satellite-based navigation system (Galileo). Hereinafter, in the disclosure, the "GPS" may be interchangeably used with the "GNSS". The wired communication may include at least one of, for example, a universal serial bus (USB), a high definition multimedia interface (HDMI), recommended standard-232 (RS-232), a power line communication, and a plain old telephone Service (POTS). The network 162 may include at least one of telecommunication networks, for example, a computer network (e.g., a LAN or a WAN), the Internet, or a telephone network.

The first and second external electronic devices 102 and 104 may be the same or different type devices from the electronic device 101. According to various embodiments of the disclosure, all or some of the operations executed by the electronic device 101 may be executed by another or a plurality of electronic devices (e.g., the electronic devices 102 and 104 or the server 106). According to an embodiment of the disclosure, when the electronic device 101 should execute some functions or services automatically or upon request, it may request at least some functions associated with the functions or services from another device (e.g., the electronic devices 102 and 104 or the server 106), in place of or in addition to directly executing the functions or services. The other electronic device (e.g., the electronic device 102 or 104 or the server 106) may execute a requested function or an additional function, and may transfer the result to the electronic device 101. The electronic device 101 may process the received result directly or additionally, and may provide a requested function or service. To this end, for example, the cloud computing, distributed computing, or client-server computing technologies may be used.

According to an embodiment, the processor 120 may try an emergency call when an emergency situation occurs. The processor 120 may detect an emergency situation and try an emergency call through at least one communication module provided by the electronic device 101. The processor 120 may try an emergency call to a server 106 that provides a communication service in an area in which the electronic device 101 is located. The processor 120 may transmit, to the server 106, a request of registration in a first communication network in a plurality of communication schemes provided by the electronic device 101 (or provided by the server 106). The server 106 may provide a communication service to an area in which the electronic device is located. The server 106 may be a server that is managed by a communication service provider of the electronic device 101 and may provide at least one of the first communication network or the second communication network to at least one electronic device. The server 106 may be a server that is managed by another communication provider and may provide at least one of the first communication network or the second communication network to at least one another electronic device. The first communication network or the second communication network is a communication service provided, by the server, to at least one electronic device in the area. The first communication network may include voice over wireless fidelity (VoWiFi), and the second communication network may include any one of 2nd generation (2G), 3rd generation (3G), or 4th generation (4G). The processor 120 may receive a response message including information indicating whether the first communication network can support the emergency call, in response to the transmission of the request for registration in the first communication network. The response message may include information on the server 106 such that an emergency call through the first communication network is possible. For example, if information indicating a failure of registration of an emergency call to the first communication network is included in the response message, the processor 120 may switch to the second communication network and may try an emergency call through the switched second communication network. If the emergency call through the first communication network is not possible, the server 106 may include information indicating that an emergency call through the second communication network is possible. If receiving the response message, the processor 120 may analyze the received response message and may analyze information on the server 106. The processor 120 may try an emergency call through the first communication network based on the analysis.

According to an embodiment, the processor 120 may receive, from the server 106, a message indicating whether the first communication network of another service provider can support the emergency call and may display the received message on the display 160. The processor 120 may determine whether the information indicating whether the received message includes the first communication network of another service provider can support the emergency call. The processor 120 may try an emergency call through the first communication network of the another service provider if the information is included. The processor 120 may set an instruction indicating whether the emergency call is tried through the first communication network or is tried after the first communication network is switched to the second communication network. If connection of an emergency call through the first communication network (e.g., VoWiFi) is not possible, the processor 120 may try connection of the emergency call through the second communication (e.g., 2G/3G/4G or LTE). If receiving a message indicating whether the first communication network of the another service provider can support the emergency call, the processor 120 may display the received message on the display 160. If receiving a message including information (e.g., Emergency Call Only) indicating that the another service provider can connect the emergency call through the first communication network, the processor 120 may display the information (e.g., Emergency Call Only) on the display 160. If receiving a message including information (e.g., No Service) indicating that the another service provider cannot connect the emergency call through the first communication network, the processor 120 may display the information (e.g., No Service) on the display 160.

According to various embodiments of the disclosure, the electronic device 101 (e.g., the processor 120) may transmit, to the server, a request for registering in the first communication network, receive, from the server, a message indicating whether the first communication network of the another service provider can support the emergency call, and display the received message.

According to an embodiment, the electronic device 101 (e.g., the processor 120) may receive, in response to the transmitted message, a response message including emergency availability information in relation to the first communication network.

According to an embodiment, the electronic device 101 (e.g., the processor 120) may try the emergency call through the first communication network based on the emergency call availability information.

According to an embodiment, if the response message does not include the emergency call availability information, the electronic device 101 (e.g., the processor 120) may switch to the second communication network and try the emergency call through the switched communication network.

According to an embodiment, the electronic device 101 (e.g., the processor 120) may display, in the received message, information indicating that the first communication network of the another service provider can support the emergency call and may try the emergency call through the first communication network of the another service provider.

According to an embodiment, if the received message includes the information indicating that the first communication network of the another service provider cannot support the emergency call, the electronic device 101 (e.g., the processor 120) may display the emergency call unavailability information.

According to an embodiment, if the received message includes the information indicating that the emergency call can be used by using the second communication network, the electronic device 101 (e.g., the processor 120) may try the emergency call through the second communication network.

According to an embodiment, the electronic device 101 further includes a display, and the electronic device 101 (e.g., the processor 120) may display, through the display, the information indicating whether the emergency call can be used and included in the received message.

According to an embodiment, the electronic device 101 (e.g., the processor 120) may be configured to try the emergency call through the second communication network based on at least a portion of the received message.

According to an embodiment, the electronic device 101 (e.g., the processor 120) may preset an instruction indicating whether the emergency call is tried through the first communication network or the second communication network after the first communication network is switched to the second communication network, and the first communication network and the second communication network may be provided by the same communication service provider.

According to an embodiment, the server may provide at least one communication service in an area in which the electronic device is located, each of the first communication network and the communication network of the another service provider may include voice over wireless fidelity (VoWiFi), and the second communication network may include any one of 2nd generation (2G), 3rd generation (3G), or 4th generation (4G).

According to various embodiments of the disclosure, a server 106 may include a short range wireless communication circuit, a memory configured to store at least one content, and at least one processor electrically connected to the short range wireless communication circuit and the memory, and the processor may be configured to receive, from an electronic device, a request for registering in a first communication network, and when the registration in the first communication network fails, transmit a message indicating whether a first communication network of another service provider can support the emergency call.

According to an embodiment, the processor may be configured to determine based on information of the electronic device included in the received request, the registration in the first communication network requested by the electronic device, generate, based on a determination, a response message including emergency call availability information in relation to the first communication network, and transmit the generated response message to the electronic device.

According to an embodiment, if the registration of the electronic device in the first communication network fails, the processor may be configured to determine whether the first communication network of the another provider supports the emergency call.

According to an embodiment, the processor may be configured to, if the first communication network of the another provider can support the emergency call, generate a message including emergency call availability information using the first communication network of the another service provider and transmit the generated message to the electronic device such that the electronic device uses the emergency call through the first communication network of the another service provider.

According to an embodiment, the processor may be configured to, if the first communication network of the another provider cannot support the emergency call, generate a message including emergency call unavailability information using the first communication network of the another service provider and transmit the generated message to the electronic device such that it is informed that the electronic device cannot use the emergency call through the first communication network of the another service provider.

Figure 2:
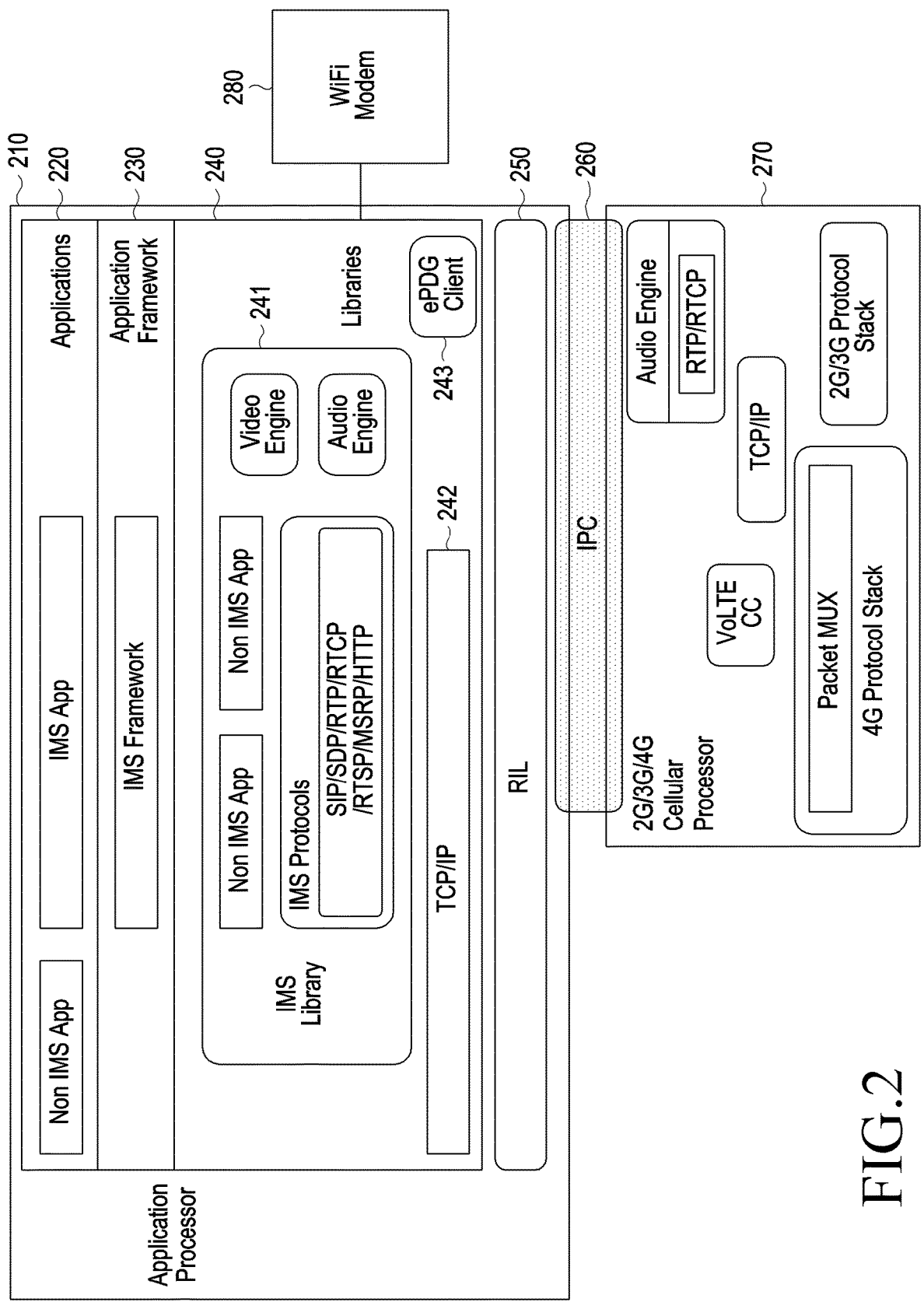
FIG. 2 is an inner block diagram for connection of an emergency call of an electronic device according to various embodiments of the disclosure.

FIG. 2 is an inner block diagram for connection of an emergency call of an electronic device according to various embodiments of the disclosure.

Referring to FIG. 2, the inner block diagram of the electronic device 101 for connection of an emergency call according to various embodiments of the disclosure may include an application processor 210, a cellular processor 270, an inter processor communication (IPC) 260, and a WiFi modem 280. The application processor 210 may include an application layer 220, an application framework network 230, and a library layer 240. The application processor 210 may further include various elements, in addition to the application layer 220, the application framework network 230, and the library layer 240, which have been described above.

The application layer 220 may represent an area in which an application program is driven. For example, in the application layer 220, an IMS application program, a non-IMS application program, and application programs executable by the electronic device 101 may be driven. The application frame layer 230 may connect the application layer 220 and the library layer 240. The library layer 240 may include modules that are necessary for providing IMS services, such as an IMS library 241 including an IMS protocol stack, a video engine, an audio engine, a radio interface layer (RIL) 250, a TCP/IP (242), and an enhanced packet data gateway (ePDG) client 243. Further, the library layer 240 may further include various elements, in addition to the above-described elements. The IMS library 241 may include a device and software that are necessary for driving an IMS protocol stack and an IMS application program. For example, the IMS protocol stack may include protocols defined in the IMS standards, such as a session initiation protocol (SIP), a session description protocol (SDP), a real time protocol (RTP), a RTP control protocol (RTCP), a real time streaming protocol (RTSP), a message session reply protocol (MSRP), and a hypertext transfer protocol (HTTP). Further, the video engine and the audio engine in the IMS library may include a device and software that are necessary for processing video data and audio data. For example, the video engine may include a device and software that are necessary for processing video data, and the audio engine may include a device and software that are necessary for processing audio data. The TCP/IP 242 is an internet standard protocol and a set of protocols defined to perform data communication between nodes (or electronic devices). Further, the ePDG client 243 may receive an SIP message or voice packet data provided through a WiFi modem. The location of the ePDG client 243 is not limited to the inside of the application processor 210, and the ePDG 243 may be included in the cellular processor 270 or may be separately provided. Further, the radio interface layer (RIL) 250 is an operating system for a wireless terminal, and for example, may provide an interface between a CellCore layer of the windows mobile and a wireless protocol stack in the cellular processor. Further, the RIL 250 may connect a communication processing modules, such as a short message service (SMS), a voice communication, and a data communication and an AT command or a unique communication protocol.

Further, the IPC 260 is an interface path between the application processor 210 and the cellular processor 270, and the application processor 210 and the cellular processor 270 may perform communication through the IPC 260.

The cellular processor 270 may provide a voice communication or a video communication through 2G, 3G, 4G, or LTE, and may process communication with an external base station (or the server) according to the corresponding protocol stack. For example, the cellular processor 270 may include a plurality of sub-modules, such as an interface with an RF system, a physical layer, and a protocol stack. Then, a modem transceiver may be classified into a plurality of communication sub-modules that support different communication networks. For example, the communication network is not limited thereto, but may include a global system for mobile communication (GSM) network, an enhanced data GSM environment (EDGE) network, a code division multiple access (CDMA) network, a W-code division multiple access (W-CDMA) network, a long term evolution (LTE) network, an orthogonal frequency division multiple access (OFDMA) network. Additionally, the cellular processor 270 may include a TCP/IP including an internet standard protocol, and a voice engine that processes a voice signal. Then, the cellular processor 270 may further include various elements, in addition to the illustrated elements.

The WiFi modem 280 may transmit and receive an SIP message or voice packet data according to the corresponding communication protocol (e.g., IEEE 802.11). Further, the cellular processor 270 may transmit and receive voice data based on a circuit switch (CS).

The electronic device 101 according to an embodiment of the disclosure may initiate connection of an emergency call through the first communication module (e.g., the cellular processor), compare the initiation of the emergency call with a reference condition, and initiate connection of the emergency call through the second communication module (e.g., the WiFi modem) in response to the comparison result.

The electronic device 101 according to another embodiment of the disclosure may initiate connection of an emergency call through the second communication module (e.g., the WiFi modem), compare the initiation of the emergency call with a reference condition, and initiate connection of the emergency call through the first communication module (e.g., the cellular processor) in response to the comparison result.

The processor 120 (e.g., the application processor) of the electronic device 101 may drive the IMS library 241 to process the video data and the audio data provided through the WiFi modem 280. Further, when the video data and the audio data are provided through the WiFi modem, the processor 120 may drive the TCP/IP and the ePDG client.

When the emergency call is connected, after setting connection by signaling with the base station through the 2G/3G/4G protocol stacks of the cellular processor 270, the processor 120 may process audio data for an emergency communication service and provide a voice communication service. Then, the processor 120 (or the application processor) may set a reference condition (e.g., drive a timer or count initiation of connection of the emergency call) and may perform emergency service connection through the WiFi modem 280 if the cellular processor 270 satisfies the reference condition for connection of the emergency call. When the timer is terminated or the number of the initiations of the connections of the emergency call is more than a predetermined number of times, the processor 120 (or the application processor) may perform an urgent service connection through the WiFi modem 280. Further, in the case of an emergency voice communication service, the processor 120 (or the application processor) may perform an emergency session through the WiFi modem 280 and may deliver a termination message for the emergency call for the cellular processor 270. Further, in the case of an emergency voice communication service, the processor 120 (or the application processor) may perform an emergency session through the WiFi modem 280 and may deliver set an emergency session for the cellular processor 270.

Figure 3:
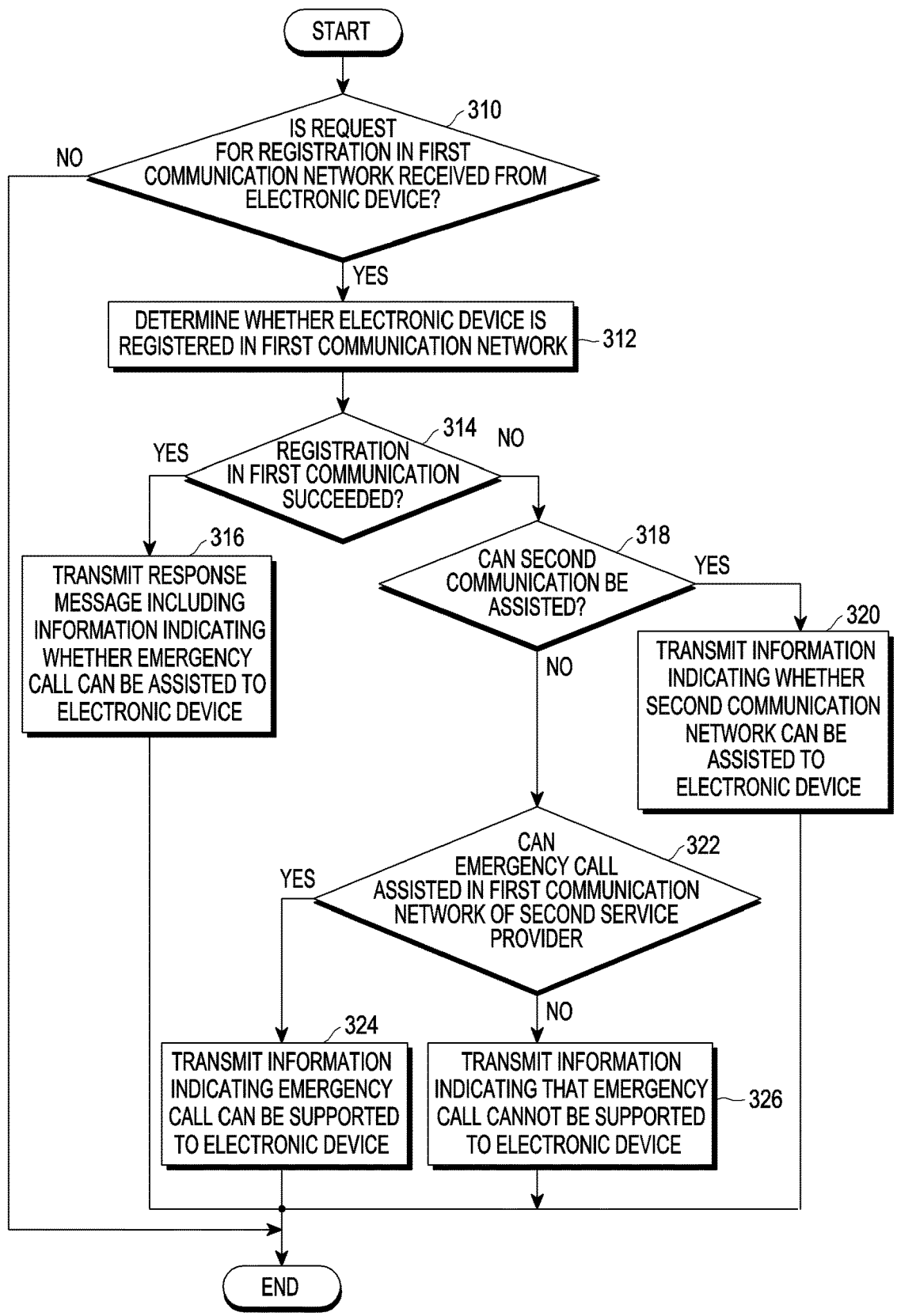
FIG. 3 is a flowchart illustrating an operation of supporting an emergency call by a server according to various embodiments of the disclosure.

FIG. 3 is a flowchart illustrating an operation of supporting an emergency call by a server according to various embodiments of the disclosure.

Hereinafter, an operation of supporting an emergency call by the server according to various embodiments of the disclosure will be described in detail with reference to FIG. 3.

According to various embodiments, in operation 310, the server 106 may receive, from the electronic device 101, a request for registration in the first communication network. The server 106 may receive a request of the electronic device 101 and may register the electronic device 101 in the first communication network. If the electronic device 101 is registered in the first communication network, the electronic device 101 may use the first communication network. The server 106 may provide a communication service to at least one electronic device that is present in a service area. The server 106 may receive, from the electronic device 101, a request for registration in, among a plurality of communication schemes provided by the electronic device 101, the first communication network.

According to various embodiments, in operation 312, the server 106 may determine whether the electronic device 101 is registered in the first communication network. The server 106 may determine whether the electronic device 101 is to be registered in the first communication network or not. The server 106 may provide a communication service to an area in which the electronic device is located. The server 106 may provide at least one of the first communication network or the second communication network to at least one electronic device. The first communication network or the second communication network is a communication service provided, by the server, to at least one electronic device in the area. The first communication network may include voice over wireless fidelity (VoWiFi), and the second communication network may include any one of 2nd generation (2G), 3rd generation (3G), or 4th generation (4G). The server 106 may provide a communication service of the first communication service provider or a communication service of the second communication service provider.

According to various embodiments, in operation 314, the server 106 may determine whether the registration of the electronic device 101 in the first communication network succeeds or fails. The server 106 may determine whether the electronic device 101 is an electronic device that subscribed to the communication service provider network, which manages the electronic device 101, or an electronic device that did not subscribe to the communication service provider network. For example, the server 106 may register the electronic device if the electronic device 101 is an electronic device that subscribed to the communication service provider network, which manages the electronic device 101. For example, the server 106 may not register the electronic device if the electronic device 101 is an electronic device that did not subscribe to the communication service provider network, which manages the electronic device 101.

According to various embodiments, in operation 316, the server 106 may transmit, to the electronic device 101, a response message including information indicating whether the emergency call can be supported. The server 106 may transmit, to the electronic device 101, the response message indicating whether the first communication network can support the emergency call for the server 106, in response to a request for registration in the first communication network. The response message may include information on the server 106 such that an emergency call through the first communication network is available. For example, if the response message includes information indicating that the registration of the emergency call in the first communication network failed, the server 106 may transmit the response message to the electronic device 101 such that the electronic device 101 switches to the second communication network provided by the communication service provider, which manages the first communication network, and try the emergency call. When the server 106 intends to inform the electronic device of the success of registration, the server 106 may transmit the response message including various pieces of information indicating the state of the server 106. Further, when the server 106 transmits a registration failure message to the electronic device, the server 106 may transmit, to the electronic device 101, an error message (e.g., error message 403) indicating that the first communication network cannot be used. Further, the electronic device 101 may determine whether the emergency call can be processed through the second communication network while the first communication network is not registered, and when it is determined that the emergency call cannot be processed even through the second communication network, may display a message (e.g., No Service). When determining that the emergency call is available through the first communication network, the server 106 may set the information indicating that the emergency call can be used in the response message to '1' and transmit the information to the electronic device 101. When determining that the emergency call is unavailable through the first communication network, the server 106 may set the emergency call availability information of the response message to '0' and transmit the information to the electronic device 101. When receiving the message in which the emergency call availability information is set to '1', the electronic device 101 can try the emergency call through the first communication network. When receiving the message in which the emergency call availability information is set to '0', the electronic device 101 can try the emergency call through the second communication network. The first communication network is a communication network based on a VoWiFi protocol, and the second communication network may be a communication network based on 2G/3G/4G or LTE.

According to various embodiments, in operation 318, the server 106 may determine whether the electronic device 101 can be supported by the second communication network. If the electronic device is not registered in the first communication network of the first communication service provider, the server 106 may determine whether the electronic device can be supported by the second communication network of the first communication service provider.

According to various embodiments, in operation 320, the server 106 may transmit, to the electronic device, the second communication network availability information. If the second communication network of the first communication service provider can support the electronic device, the server 106 may transmit, to the electronic device, the information indicating that the second communication network can support the emergency call. In operation 320, the information may not be transmitted to the electronic device 101.

According to various embodiments, in operation 322, the server 106 may determine whether the emergency call can be supported. If the registration in the first communication network is not possible, the server 106 may determine whether the emergency call through the first communication network of the another service provider is possible. For example, the server 106 may determine whether the electronic device 101 that transmitted the request is a device that receives a communication network provided by the server 106 or a device that does not receive the communication network provided by the server 106 (e.g., receive a service of the another communication service provider). In this way, when the registration fails, it may correspond to a case in which the electronic device 101 did not subscribe to the communication network provided by the server 106. The server 106 may determine whether the emergency call can be supported to the electronic device 101 by the first communication network.

According to various embodiments, in operation 324, the server 106 may transmit, to the electronic device 101, the information indicating that the emergency call can be supported. The server 106 may transmit, to the electronic device 101, the message indicating whether the emergency call can be used by using the first communication network of the another service provider. When determining that the electronic device 101 cannot connect the emergency call through the first communication network (e.g., VoWiFi), the server 106 may transmit, to the electronic device 101, the message indicating whether the emergency call can be used by using the first communication network of the another service provider such that the electronic device 101 tries connection of the emergency call through the first communication network (e.g., VoWiFi) of the another service provider. The server 106 may transmit, to the electronic device 101, a message including the information (e.g., Emergency Call Only) indicating that the connection of the emergency call through the first communication network of the another service provider can be connected.

According to various embodiments, in operation 326, the server 106 may transmit, to the electronic device 101, the information indicating that the emergency call cannot be supported. The server 106 may transmit, to the electronic device 101, the message indicating that the emergency call cannot be used by using the first communication network of the another service provider. When determining that the electronic device 101 cannot connect the emergency call through the first communication network (e.g., VoWiFi) of the another service provider, the server 106 may transmit, to the electronic device 101, the message indicating that the emergency call cannot be used by using the first communication network of the another service provider. The server 106 may transmit, to the electronic device 101, a message including the information (e.g., No Service) indicating that the emergency call cannot be connected through the first communication network of the another service provider.

Figure 4:
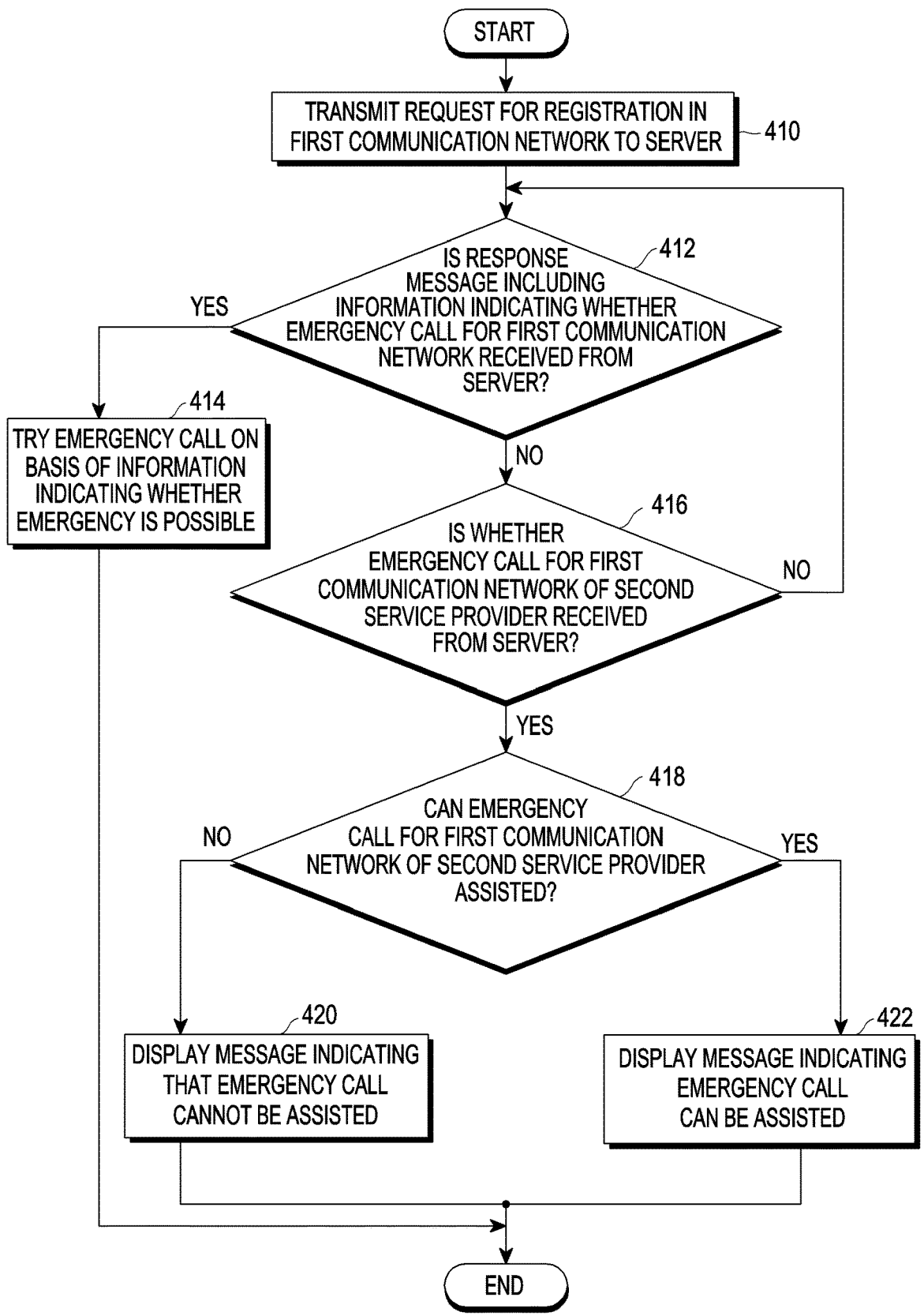
FIG. 4 is a flowchart illustrating an operation of supporting an emergency call by an electronic device according to various embodiments of the disclosure.

FIG. 4 is a flowchart illustrating an operation of supporting an emergency call by an electronic device according to various embodiments of the disclosure.

Hereinafter, an operation of supporting an emergency call by the electronic device according to various embodiments of the disclosure will be described in detail with reference to FIG. 4.

According to various embodiments, in operation 410, the electronic device 101 (e.g., the processor 120) may transmit, to the server 106, a request for registration in the first communication network. The electronic device 101 (e.g., the processor 120) may try an emergency call when an emergency situation occurs. The electronic device 101 (e.g., the processor 120) may detect an emergency situation and try an emergency call through at least one communication module provided by the electronic device 101. If the registration in the first communication network succeeds, the electronic device 101 (e.g., the processor 120) may try the emergency call through the first communication network of the server 106 that provides a communication service in an area in which the electronic device 101 is located. The electronic device 101 (e.g., the processor 120) may request registration in the first communication network in a plurality of communication schemes provided by the electronic device 101 (or provided by the server 106).

According to various embodiments, in operation 412, the electronic device 101 (e.g., the processor 120) may receive, from the server 106, a response message including the emergency call availability information in relation to the first communication network. The electronic device 101 (e.g., the processor 120) may receive a response message including the emergency call availability information in relation to the first communication network, in response to the request for registration in the first communication network. The response message may include information on the server 106 such that an emergency call through the first communication network is available.

According to various embodiments, in operation 414, the electronic device 101 (e.g., the processor 120) may try the emergency call based on the emergency call availability information. If receiving the response message, the electronic device 101 (e.g., the processor 120) may analyze the received response message and may analyze information on the server 106. The electronic device 101 (e.g., the processor 120) may try an emergency call through the first communication network based on the analysis.

According to various embodiments, in operation 416, the electronic device 101 (e.g., the processor 120) may receive, from the server 106, information indicating whether the first communication network of the another service provider can support the emergency call. For example, when the registration in the first communication network failed (or when receiving the information indicating that the registration of the emergency call for the first communication network failed), the electronic device 101 (e.g., the processor 120) may switch to the second communication network and try the emergency call through the switched second communication network. If the emergency call through the first communication network is not possible, the server 106 may generate a message including the information indicating that the emergency call through the first communication network of the another service provider is possible.

According to various embodiments, in operation 418, the electronic device 101 (e.g., the processor 120) may determine whether the first communication network of the another service provider can support the emergency call. If the emergency call through the first communication network is not possible, the electronic device 101 (e.g., the processor 120) may determine whether the emergency call through the first communication network of the another service provider is available. When receiving, from the server 106, information indicating emergency call availability using the first communication network of the another service provider, the electronic device 101 (e.g., the processor 120) may determine whether the emergency call using the first communication network of the another service provider is available or unavailable.

According to various embodiments, in operation 420, the electronic device 101 (e.g., the processor 120) may display a message indicating that the emergency call cannot be supported. The electronic device 101 (e.g., the processor 120) may receive, from the server 106, emergency call unavailability information. The electronic device 101 (e.g., the processor 120) may receive, from the server 106, the message indicating that the emergency call using the first communication network of the another service provider cannot be used. When determining that the electronic device 101 cannot connect the emergency call through the first communication network (e.g., VoWiFi) of the another service provider, the server 106 may transmit, to the electronic device 101, the message indicating that the emergency call cannot be used by using the first communication network of the another service provider. The electronic device 101 (e.g., the processor 120) may receive, from the server 106, the message including the information (e.g., No Service) indicating that connection of the emergency call through the first communication network of the another service provider cannot be used.

The electronic device 101 (e.g., the processor 120) may receive, from the server 106, a message indicating whether the emergency call using the first communication network of the another service provider can be used and may display the received message on the display 160. The electronic device 101 (e.g., the processor 120) may determine whether the received message includes the information indicating that the emergency call can be used by using the first communication network of the another service provider. If the connection of the emergency call through the first communication network (e.g., VoWiFi) of the first service provider is impossible, the electronic device 101 (e.g., the processor 120) may try connection of the emergency call through the first communication network (e.g., VoWiFi) of a second service provider. When receiving a message indicating whether the connection of the emergency call through the first communication network of the second service provider is available, the electronic device 101 (the processor 120) may display the received message on the display 160. If receiving a message including information (e.g., No Service) indicating that the second service provider cannot connect the emergency call through the first communication network, the electronic device 101 (e.g., the processor 120) may display the information (e.g., No Service) on the display 160.

According to various embodiments, in operation 422, the electronic device 101 (e.g., the processor 120) may display a message indicating that the emergency call can be supported. The electronic device 101 (e.g., the processor 120) may receive, from the server 106, the emergency call availability information. The electronic device 101 (e.g., the processor 120) may receive, from the server 106, the message indicating whether the emergency call using the first communication network of the another service provider can be used. When determining that the electronic device 101 cannot connect the emergency call through the first communication network (e.g., VoWiFi) of the first service provider, the server 106 may transmit, to the electronic device 101, the message indicating whether the emergency call using the first communication network of the second service provider can be used such that the electronic device 101 tries connection of the emergency call through the first communication network (e.g., VoWiFi) of the second service provider. The electronic device 101 (e.g., the processor 120) may receive, from the server 106, the message including the information (e.g., Emergency Call Only) indicating that connection of the emergency call through the first communication network of the second service provider is possible.

If receiving a message including information (e.g., No Service) indicating that the second service provider cannot connect the emergency call through the first communication network of the second service provider, the electronic device 101 (e.g., the processor 120) may display the information (e.g., No Service) on the display 160.

According to various embodiments of the disclosure, a method for providing an emergency call by an electronic device may include transmitting, to the server, a request for registering in the first communication network, receiving, from the server, a message indicating whether the first communication network of the another service provider can support the emergency call, and displaying the received message.

According to an embodiment, the disclosure may further include receiving, in response to the transmitted message, information indicating whether the first communication network can be used for the emergency call.

According to an embodiment, the disclosure may further include trying the emergency call through the first communication network based on the emergency call availability information.

According to an embodiment, the disclosure may further include, if the response message does not include the emergency call availability information, switching to a second communication network, and trying the emergency call through the switched second communication network.

According to an embodiment, the disclosure may further include, if the information on whether the received message includes the another service provider can support the emergency call, displaying emergency call availability information, and trying the emergency call through the first communication network of the another service provider.

According to an embodiment, the disclosure may further include, if the received message includes information indicating the emergency call unavailability in relation to the first communication network of the another service provider, displaying information on that the emergency call cannot be supported.

According to an embodiment, the disclosure may further include trying the emergency call through the second communication network based on at least a portion of the received second message.

Figure 5A:
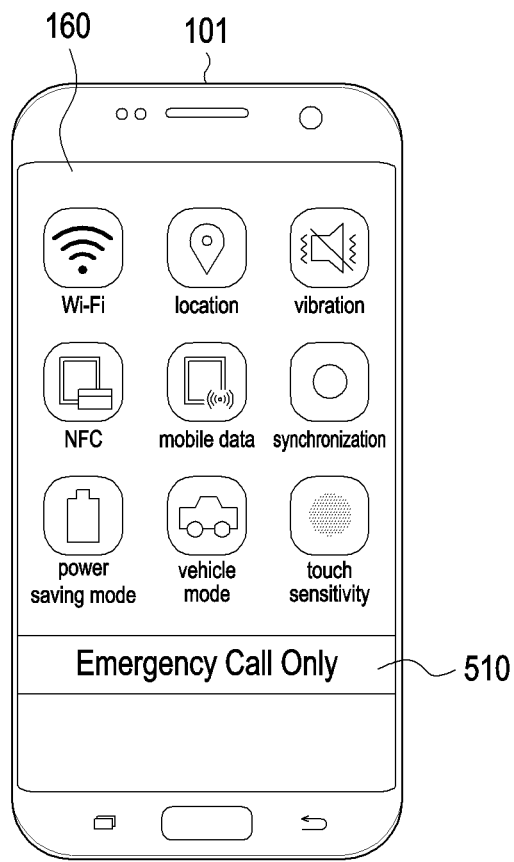
FIG. 5A is an exemplary view indicating that an emergency call can be supported according to an embodiment of the disclosure.
Figure 5B:
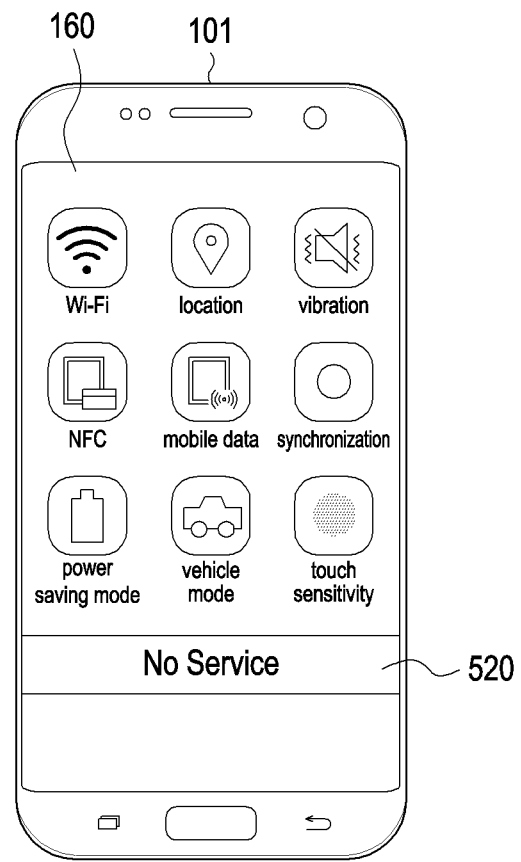
FIG. 5B is an exemplary view indicating that an emergency call cannot be supported according to an embodiment of the disclosure.

FIG. 5A is an exemplary view indicating that an emergency call can be supported according to an embodiment of the disclosure. FIG. 5B is an exemplary view indicating that an emergency call cannot be supported according to an embodiment of the disclosure.

According to various embodiments, the electronic device 101 (e.g., the processor 120) may receive, from the server 106, whether the emergency call using the communication network can be used, and may analyze the received message and display, on the display 160, whether the emergency call using the communication network can be used. The electronic device 101 (e.g., the processor 120) may determine whether the received information includes the information indicating that the emergency call can be used by using the communication network. For example, if the connection of the emergency call through the first communication network (e.g., VoWiFi) of the first service provider is impossible, the electronic device 101 (e.g., the processor 120) may try connection of the emergency call through the first communication network (e.g., VoWiFi) of the second service provider. When receiving a message indicating whether the connection of the emergency call through the first communication network of the second service provider is available, the electronic device 101 (the processor 120) may analyze the received message and display, on the display 160, whether the emergency call using the second communication network of the second service provider can be used.

Referring to FIG. 5A, the display 160 of the electronic device 101 may display icons for various functions provided by the electronic device. Further, the electronic device 101 may display a message indicating that the emergency call can be supported to a partial area (e.g., 510) of the display 160. The electronic device 101 (e.g., the processor 120) may display, on the partial area (e.g., 510) of the display 160, the information indicating that the emergency call received from the server 106 can be supported. When determining that the electronic device 101 can connect the emergency call through the first communication network (e.g., VoWiFi) of the another service provider, the server 106 may transmit, to the electronic device 101, the message indicating that the emergency call can be used by using the first communication network of the another service provider. The electronic device 101 (e.g., the processor 120) may receive, from the server 106, the message including the information (e.g., Emergency Call Only) indicating that connection of the emergency call through the first communication network of the another service provider is possible.

Referring to FIG. 5B, the electronic device 101 may display a message indicating that the emergency call cannot be supported to a partial area (e.g., 520) of the display 160. The electronic device 101 (e.g., the processor 120) may display, on the partial area (e.g., 520) of the display 160, the information indicating that the emergency call received from the server 106 cannot be supported. When determining that the electronic device 101 cannot connect the emergency call through the first communication network (e.g., VoWiFi) of the another service provider, the server 106 may transmit, to the electronic device 101, the message indicating that the emergency call cannot be used by using the first communication network of the another service provider. The electronic device 101 (e.g., the processor 120) may receive, from the server 106, the message including the information (e.g., Emergency Call Only) indicating that connection of the emergency call through the first communication network of the another service provider is impossible. In FIGS. 5A and 5B, the message indicating whether the first communication network of the another service provider can be supported may be displayed on an initial screen (or a background screen).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a compiler or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The invention claimed is:

1. An electronic device comprising:
a short range wireless communication circuit;
a display; and
at least one processor electrically connected to the short range wireless communication circuit and the display,
wherein the at least one processor is configured to:
transmit via the short range wireless communication circuit, to a server, a request for registering in a first communication network;
receive via the short range wireless communication circuit, from the server, a response message indicating that the electronic device is registered in the first communication network in response to the transmitted request, the response message comprising information indicating whether an emergency call is available in the first communication network, and
in response to the response message comprising information that the emergency call is available in the first communication network, display a message that the emergency call is available on the display.

2. The electronic device of claim 1, wherein the at least one processor is further configured to:
receive via the short range wireless communication circuit, from the server, another response message indicating that the electronic device is not permitted to be registered in the first communication network, the other response message comprising another information indicating whether the emergency call is available or not,
based on the other message comprising the other information indicating that the emergency call is available, display the message that the emergency call is available on the display.

3. The electronic device of claim 1, wherein the at least one processor is further configured to make an emergency call through the first communication network based on the information that the emergency call is available in the first communication network.

4. The electronic device of claim 2, wherein the at least one processor is configured to:
in response to the other response message comprising the other information indicating the emergency call is not available in the first communication network, switch to a second communication network and make the emergency call through the switched to second communication network.

5. The electronic device of claim 2,
wherein the first communication network is provided by a first service provider, and
wherein the at least one processor is further configured to:
in response to the other message comprising the other information indicating that the emergency call is not available in the first communication network, receive via the short range wireless communication circuit, from the server, a message indicating whether the emergency call is available or not, in a first communication network provided by a second service provider, based on the message indicating whether the emergency call is available or not; comprising information indicating that the emergency call is available in the first communication network provided by the second service provider, display the message that the emergency call is available on the display and make the emergency call through the first communication network of the second service provider.

6. The electronic device of claim 2, wherein the at least one processor is configured to:
in response to the emergency call being now available in the first communication network and a second communication network, display another message that emergency call is not available on the display.

7. The electronic device of claim 1, wherein the at least one processor is configured to preset an instruction indicating whether the emergency call is made through the first communication network or is made after the first communication network is switched to a second communication network, and
the first communication network and the second communication network are provided by the same communication service provider.

8. A method for providing an emergency call by an electronic device, the method comprising:
transmitting, via a short range wireless communication circuit of the electronic device, to a server, a request for registering in a first communication network;
receiving, via the short range wireless communication circuit of the electronic device, from the server, a response message indicating that the electronic device is registered in the first communication network in response to the transmitted request, the response message comprising information indicating whether an emergency call is available in the first communication network; and
in response to the message comprising information that the emergency call is available in the first communication network, displaying a message that the emergency call is available.

9. The method of claim 8, further comprising:
making the emergency call through the first communication network based on the information that emergency call is available in the first communication network.

10. The method of claim 8, further comprising:
receiving, via the short range wireless communication circuit of the electronic device, from the server, another response message indicating that the electronic device is not permitted to be registered in the first communication network, the other response message comprising another information indicating whether the emergency call is available or not,
based on the other message comprising the other information indicating that the emergency call is available, displaying the message that the emergency call is available.

11. A server comprising:
a short range wireless communication circuit; and
at least one processor electrically connected to the short range wireless communication circuit,
wherein the at least one processor is configured to:
receive via the short range wireless communication circuit, from an electronic device, a request for registering in a first communication network; and
transmit via the short range wireless communication circuit, to the electronic device, a response message indicating that the electronic device is registered in first communication network in response to the received request, the response message comprising information indicating whether an emergency call is available in the first communication network.

12. The server of claim 11, wherein the at least one processor is configured to:
determine, based on information of the electronic device included in the received request, the registration in the first communication network requested by the electronic device;
generate, based on the determination, the response message including information that the emergency call is available in the first communication network; and
transmit via the short range wireless communication circuit, the generated response message to the electronic device.

13. The server of claim 11, wherein the at least one processor is configured to:
in response to the electronic device being not permitted to be registered in the first communication network, generate another response message comprising information whether the emergency call is available or not.

14. The server of claim 13, wherein the at least one processor is configured to:
in response to the emergency call being available in the first communication network, generate the other response message including information that the emergency call is available; and
transmit via the short range wireless communication circuit, the other message to the electronic device such that the electronic device makes the emergency call through the first communication network.

15. The server of claim 13, wherein the at least one processor is configured to:
in response to the emergency call being now available in the first communication network, determine whether the emergency call is available in a second communication network; and
based on the emergency call being available in the second communication network, transmit via the short range wireless communication circuit, the response message comprising information indicating the emergency call is available in the second communication network to the electronic device such that the electronic device makes the emergency call through the second communication network.

16. The server of claim 11, wherein the server is connected to the electronic device through an access point, and
wherein the server is connected to the access point through a wired communication via the short range wireless communication circuit and the access point is connected to the electronic device through a wireless communication.

* * * * *